United States Patent [19]
Wallack

[11] Patent Number: 5,933,645
[45] Date of Patent: *Aug. 3, 1999

[54] NON-INVASIVE EXTENSIBILITY OF SOFTWARE APPLICATIONS

[75] Inventor: Peter Wallack, Sunnyvale, Calif.

[73] Assignee: Oracle Corporation, Redwood Shores, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/618,126

[22] Filed: Mar. 19, 1996

[51] Int. Cl.⁶ ........................................... G06F 9/445
[52] U.S. Cl. .................. 395/712; 707/1; 707/10
[58] Field of Search ..................... 395/701, 672, 395/673, 674, 702, 712; 364/131; 345/333; 707/1, 10

[56] References Cited

U.S. PATENT DOCUMENTS

| | | | |
|---|---|---|---|
| 5,522,073 | 5/1996 | Courant et al. | 395/701 |
| 5,600,778 | 2/1997 | Swanson et al. | 395/333 |
| 5,640,319 | 6/1997 | Beuning | 364/131 |

*Primary Examiner*—Majid A. Banankhah
*Attorney, Agent, or Firm*—Fliesler, Dubb, Meyer & Lovejoy

[57] ABSTRACT

A software system having a software application that generates an event notification message for each of a set of predefined significant events and having a custom extension module that receives the notification message and then selects a coordination style. The coordination style determines whether a custom event handler for the significant event contained in the custom extension module supplements or replaces a default event handler for the significant event contained in the software application.

27 Claims, 9 Drawing Sheets

NON-INVASIVE EXTENSIBILITY OF SOFTWARE APPLICATIONS

BACKGROUND OF THE INVENTION

1. Field of Invention

The present invention pertains to the field of computer software. More particularly, this invention relates to a mechanism for non-invasive extensions to software applications.

2. Art Background

Vendors of software systems commonly market such systems to a wide variety of differing types of business end-users. Such software vendors typically provide software applications and software tools with generic functions that appeal to a variety of business types.

For example, vendors of database systems commonly provide software applications such as database entry forms and database report forms with generic database access functions. Typically, such generic software applications enable end-users to add information to the database and to create reports from information contained in the database. However, such generic software applications are usually not tuned to the specific needs of any one particular business end-user. As a consequence, end-users commonly customize the generic software applications provided by the software vendor.

In prior systems, such end-user customization usually involves user-specific modifications of application program source code. Typically, an end-user acquires a copy of the application source code from the software vendor and thereafter enters user-specific modification to the source code. Such a technique requires that the end-user first become familiar with the nature of the source code for the application in order to enter the appropriate customizations. The modified source code is then recompiled to provide a unique executable version of the software application at the user site.

Unfortunately, such a prior technique of modifying application source code severely complicates the process of providing support for software applications. For example, the end-user must usually re-enter source code changes for the particular customization after each new release or update of the software application. Such re-entry of the same customization to multiple versions of source code typically increases the overall cost of maintaining database software at the customer site.

In addition, such prior techniques of customizing source code complicate the process of isolating software problems at a user site. For example, such customization of source code raises an issue as to whether the originally shipped source code from the software vendor has a software bug or whether the user-specific customization of the source code gave rise to a software bug. Such uncertainties usually hinder the overall efficiency of providing software support at customer sites.

SUMMARY AND OBJECTS OF THE INVENTION

One object of the present invention is to enable an end-user to customize software applications without modifying the application source code.

Another object of the present invention is to obviate the need for an end-user to study and understand the inner workings of application source code provided by a software vendor.

A further object of the present invention is to isolate vendor-supplied application programs from user customizations to facilitate software support.

These and other objects are provided by a software system including a software application that generates an event notification message for each of a set of predefined significant events in the software application. A custom extension module for the software application receives the notification message and then selects a coordination style. The coordination style determines whether a custom event handler for the significant event contained in the custom extension module supplements or replaces a default event handler for the significant event contained in the software application.

Other objects, features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
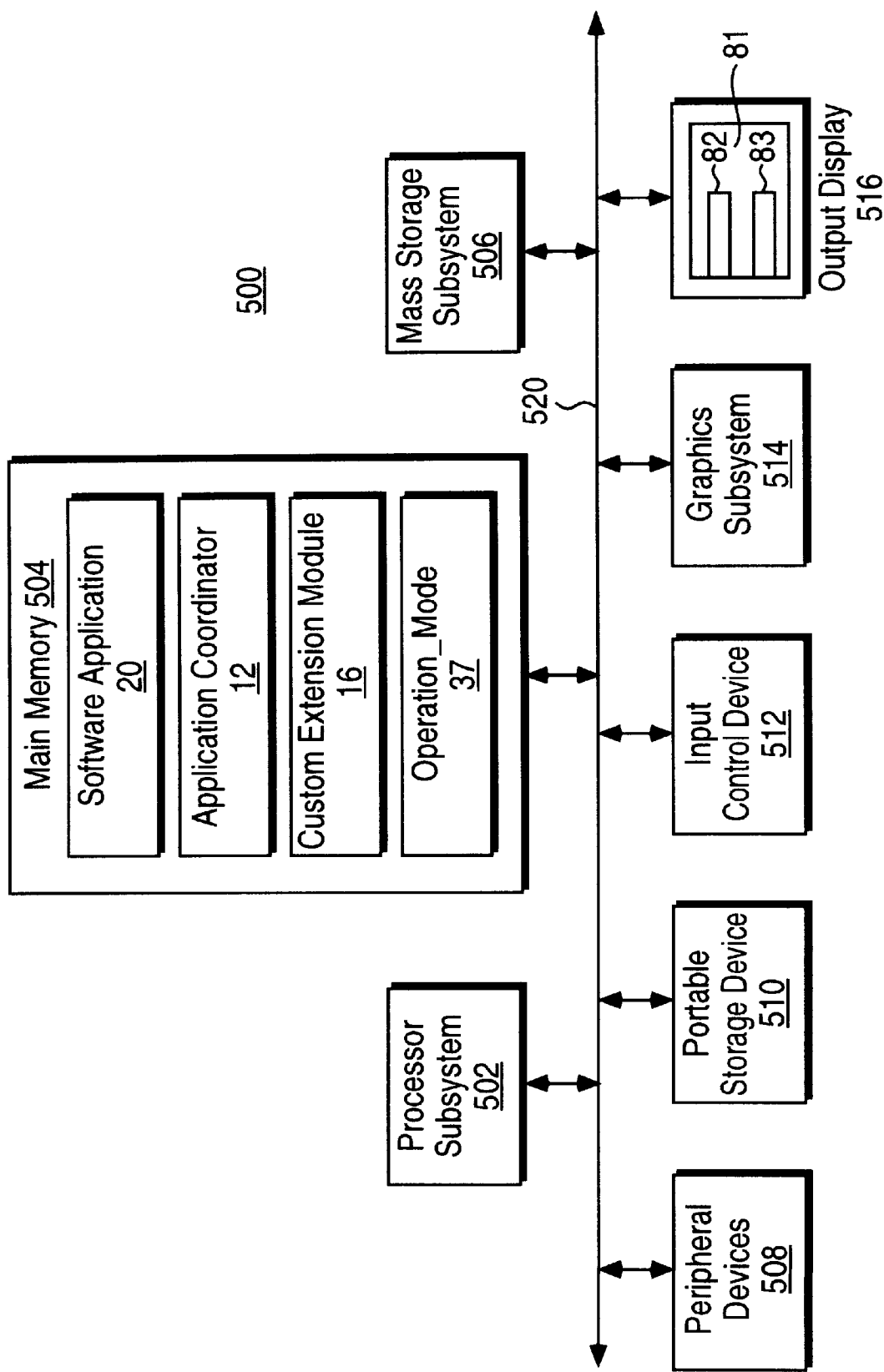
FIG. 1 illustrates a computer system that accommodates noninvasive extensions to software applications.

FIG. 1 illustrates a computer system 500 that accommodates noninvasive extensions to software applications. The computer system 500 includes a processor subsystem 502, a main memory 504 and an interconnect bus 520. The processor subsystem 502 may include a single microprocessor or central processing unit (CPU) or may include a plurality of microprocessors or CPUs. The main memory 504 accommodates the storage of instructions and data for execution by the processor subsystem 502. The main memory 504 accommodates a software application 20, an application coordinator 12 and a custom extension module 16 each of which contain instruction code for the processor subsystem 502. In addition, the main memory 504 accommodates an operation_mode flag 37 which is used to control execution modes of custom extensions to the software application 20. The main memory 504 may include dynamic random access memory (DRAM) as well as a cache memory.

The computer system 500 also includes a mass storage subsystem 506, a set of peripheral devices 508, a portable storage device 510, an input control device 512, a graphics subsystem 514 and an output display 516. In one embodiment the various components of the computer system 500 communicate via the interconnect bus 520 which is a local bus. In other embodiments elements of the computer system 500 may be connected via one or more data transport mechanisms. Such transport mechanisms may include, for example, processor buses as well as specialized input/output peripheral buses.

The mass storage subsystem 506, which may be implemented with a magnetic disk drive or an optical disk drive, is a non-volatile storage device for storing data and instructions for use by the processor subsystem 502. The mass storage subsystem 506 stores application programs and noninvasive extensions, the application coordinator and library routines as well as related system software for loading to the main memory 506.

The portable storage device 510 operates in conjunction with a portable non-volatile storage medium, such as a magnetic tape, a floppy disk or a compact disc read only memory (CD-ROM), to input and output data and code to and from the computer system 500. In one embodiment, application programs and related system software from the software vendor are stored and distributed on such a portable medium, and is input to the computer system 500 via the portable storage device 510.

The peripheral devices 508 may include any type of computer support device, such as an input/output (I/O) interface, to add additional functionality to the computer system 500. For example, the peripheral devices 508 may include a network interface card for interfacing the computer system 500 to a network. The new versions of application programs and other software elements may be input to the computer system 500 via a portable storage medium or a network.

The input control device 512 provides a portion of the user interface for a user of the computer system 500. The input control device 512 may include an alphanumeric keypad for inputting alphanumeric and other key information, a cursor control device, such as a mouse, a trackball, stylus, or cursor direction keys.

In order to display textual and graphical information, the computer system 500 contains the graphics subsystem 514 and the output display 516. The output display 516 may include a cathode ray tube (CRT) display or liquid crystal display (LCD). The graphics subsystem 514 receives textual and graphical information, and processes the information for output to the output display 516. The output display 516 in one embodiment displays an entry form 81 having a set of input fields 82 and 83 which are used to enter item identifiers.

The application programs, coordinator, and noninvasive extensions are each implemented as software that includes a plurality of computer executable instructions for a general purpose computer system. Prior to loading into a general purpose computer system, the software may reside as encoded information on a computer readable medium, such as a magnetic floppy disk, magnetic tape, and compact disc read only memory (CD - ROM).

Figure 2:
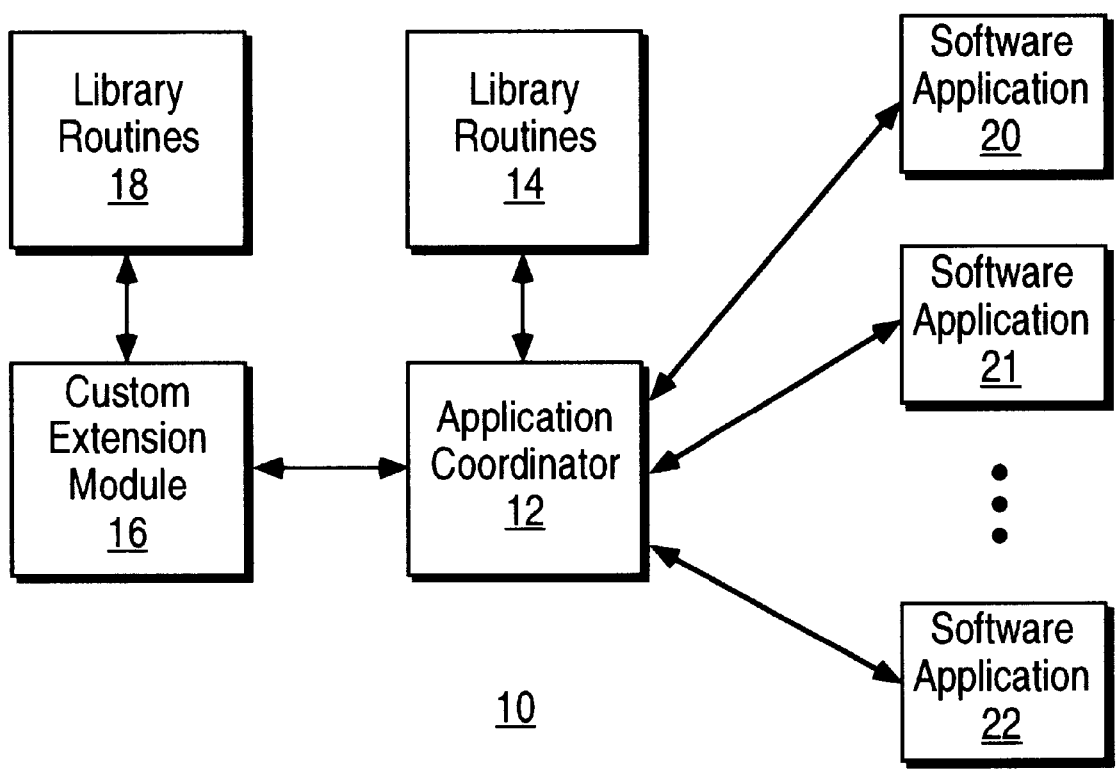
FIG. 2 illustrates portions of a software system including a set of software applications and custom extension modules.

FIG. 2 illustrates relevant portions of a software system 10 in one embodiment. The software system 10 includes a set of software applications 20–22. Each of the software applications 20–22 in this embodiment are software applications that provide access functions for a database system. The software applications 20–22 may comprise, for example, data entry applications such as data entry forms as well as report applications and other types of user interface applications.

The software system 10 includes an application coordinator 12 that enables communication between the software applications 20–22 and corresponding custom extension modules. The application coordinator 12 provides a messaging structure between the software applications 20–22 and the custom extension modules that enable a variety of coordination styles. The coordination styles enable the custom extension modules to supplement or replace the default functions implemented in the software applications 20–22.

The software applications 20–22 notify the custom extension modules of significant events by transferring messages to the custom extension modules through the application coordinator 12. Significant events include, for example, user interface events such as the movement of a cursor between the fields 82 and 83 in the forms file 81 as well as major computational events in the software applications 20–22.

The vendor for the software system 10 provides the software applications 20–22 along with default versions of the custom extension modules. The default versions of the custom extension modules receive notification messages from the software applications 20–22 through the application coordinator 12. The default versions of the custom extension modules do not perform custom event handling in response to the notification messages from the application coordinator 12. Instead, the default versions of the custom extension modules merely return a default message that causes the software applications 20–22 to proceed with default event handling.

The end-user of the software system 10 has the option of replacing the default versions of the custom extension modules with end-user supplied custom extension modules. The end-user supplied custom extension modules implement custom event handlers. The custom event handlers provide extensions to or replacement of the default event handlers in the software applications 20–22.

The end-user custom extension modules employ a variety of coordination styles. One coordination style enables the execution of default event handlers in the software applications 20–22 prior to execution of corresponding custom event handlers in the custom extension modules. Another coordination style enables execution of custom event handlers in the custom extension modules prior to corresponding default event handlers in the software applications 20–22. Yet another coordination style enables the execution of event handlers in the custom extension modules in place of the default event handlers in the software applications 20–22.

In the example shown in FIG. 2, the end-user of the software system 10 replaces the default custom extension module for the software application 20 with the custom extension module 16. The custom extension module 16 supplements or replaces some of the functions performed by the software application 20. The software application 20 notifies the custom extension module 16 of significant events by transferring event names through the application coordinator 12. Once notified of a significant event, the custom extension module 16 selects a coordination style for handling the event which may involve a custom event handler.

The custom extension module 16 in one embodiment invokes the services provided by a set of library routines 18. The library routines 18 may be implemented in a variety of programming tools such as the C programming language or the programming tools supplied by the software vendor that provides the software applications 20–22. In one embodiment such tools comprise the Developer/2000 Toolset available from Oracle Corporation of Redwood City, Calif.

In addition, the application coordinator 12 functions in a first debug mode wherein notification messages from the software application 20–22 are not forwarded to the custom extension modules. The debug mode isolates the custom extension modules from the remainder of the software system 10 which facilitates debugging of the code of the software applications 20–22. The application coordinator 12 also functions in a second debug mode that records and reports changes to the software applications 20–22 before and after calls to the custom extension modules.

Figure 3:
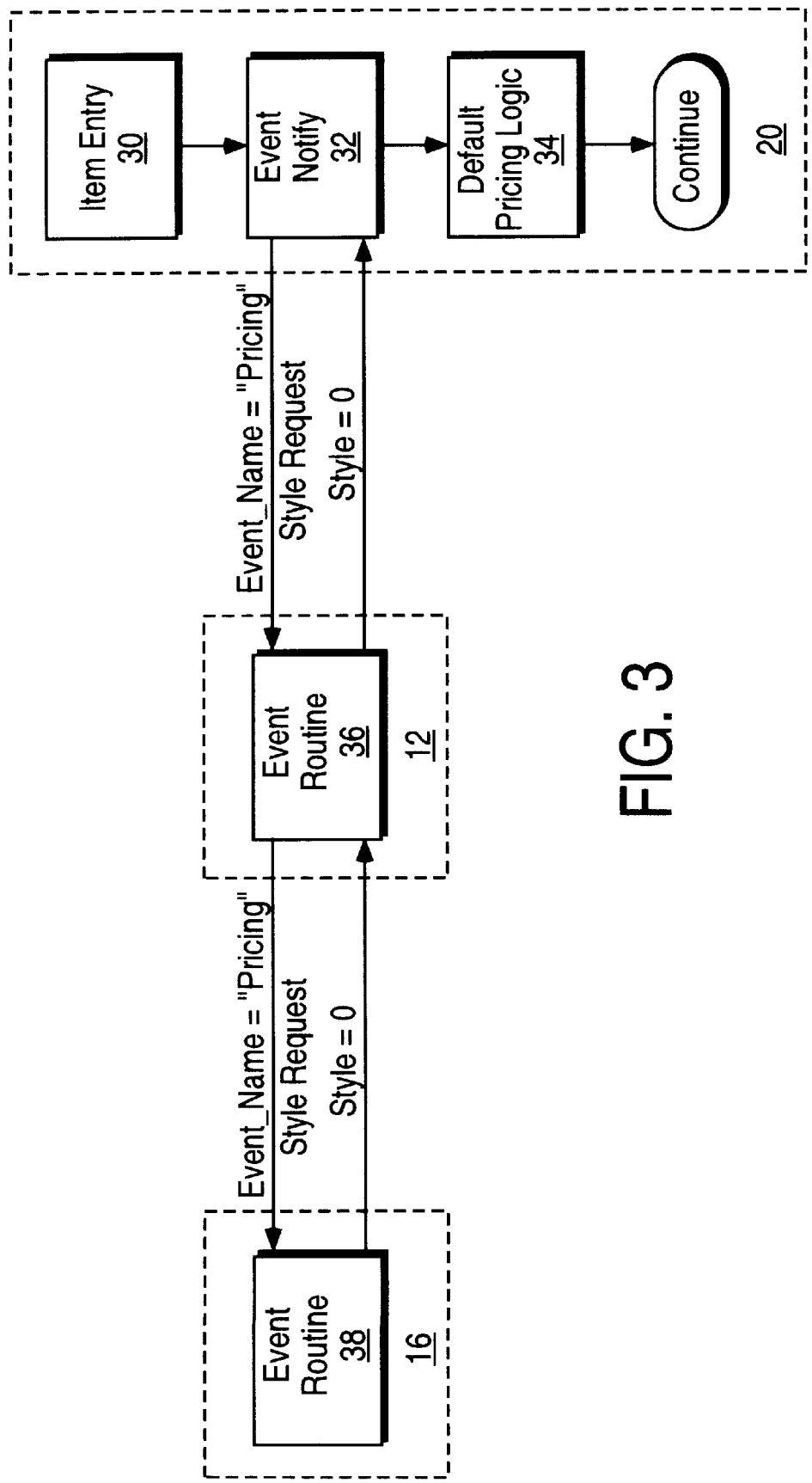
FIG. 3 illustrates communication between a software application and a default version of a custom extension module.

FIG. 3 illustrates communication between the software application 20 and the default version of the custom extension module 16. The default version of the custom extension module 16 is provided by the software vendor that provides the software application 20. In this example, the software application 20 is an order entry form that implements a set of default pricing logic 34. The default pricing logic 34 provides a default event handler for a pricing operation after item entry.

An item entry function 30 in the software application 20 enables entry of an item identifier through the entry form 81 displayed on the output display 516. After the user enters an item identifier via the item entry function 30, the software application 20 performs an event notify function 32. The event notify function 32 notifies the custom extension module 16 of a significant event in the software application 20.

The event notify function 32 calls an event routine 36 in the application coordinator 12. The call to the event routine 36 passes an event_name parameter that identifies the significant event in the software application 20. In this example the significant event is the entry of an item identifier that requires a pricing function. Accordingly, the event notify function 32 passes an event_name=PRICING parameter and style request to the event routine 36.

The event routine 36 in turn calls an event routine 38 in the default version of the custom extension module 16 and passes the event_name=PRICING parameter and a style request. The default version of the custom extension module 16 responds by returning to the event routine 36 with a default style request indication or flag (style=0). The event routine 36 then returns the style=0 indication back to the event notify function 32. The returned style=0 indication causes the event notify function 32 to execute the default pricing logic 34.

Figure 4:
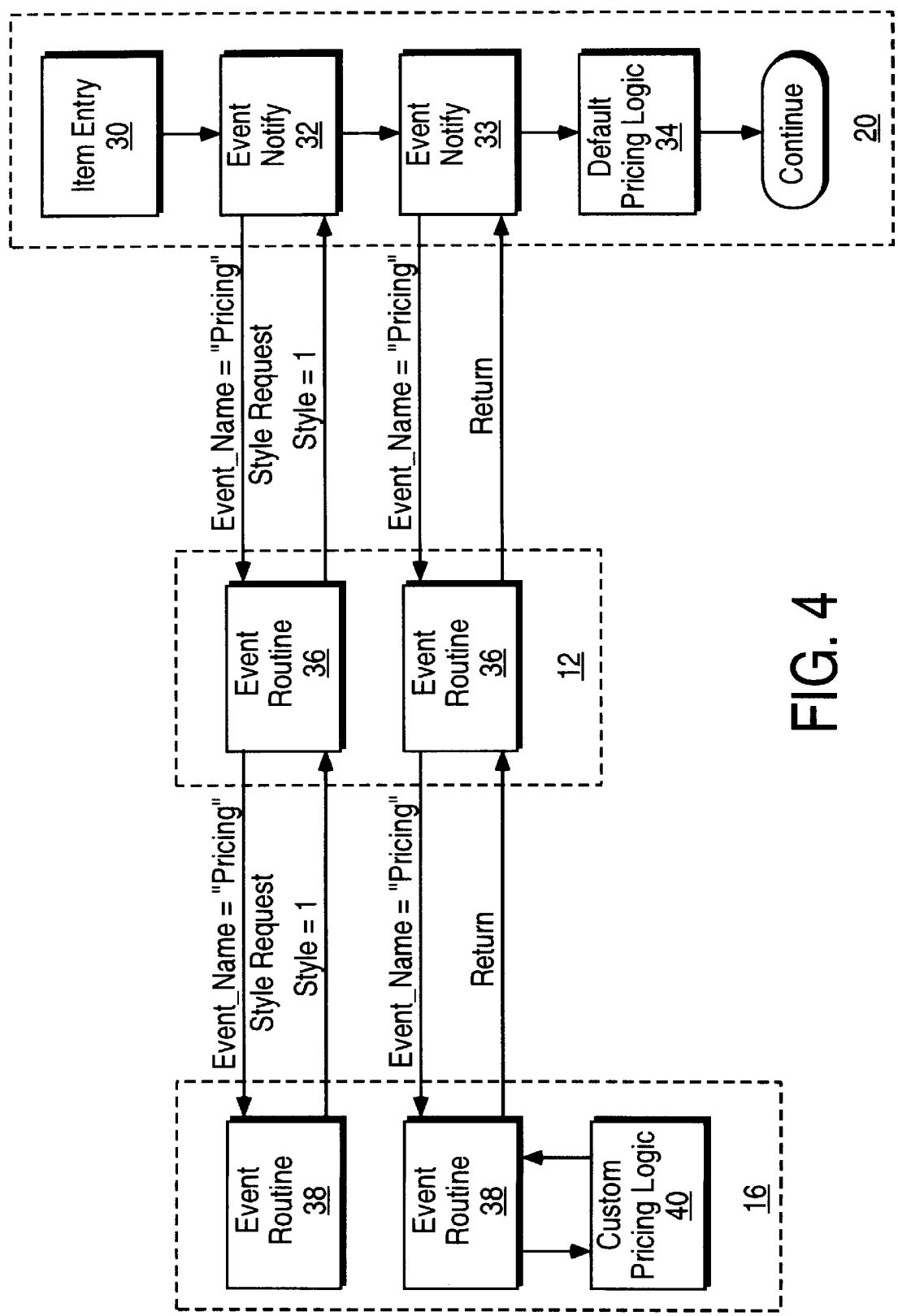
FIG. 4 illustrates a coordination style wherein custom event logic in a custom extension module is executed before the corresponding default event logic in a software application.

FIG. 4 illustrates a coordination style wherein custom event logic in the custom extension module 16 is executed before the corresponding default event logic in the software application 20. The custom event logic in this example is the custom pricing logic 40 which is an extension of the pricing operation of the software application 20.

After the user enters an item identifier through the item entry function 30, the event notify function 32 calls the event routine 36 and passes the event_name=PRICING parameter which indicates that a pricing operation is the next major event in the software application 20. The event notify function 32 also passes a style request indication such as a style request flag. The event routine 36 in turn calls the event routine 38 in the custom extension module 16 and passes the event_name=PRICING parameter and style request indication.

The event routine 38 responds to the event_name=PRICING parameter and style request indication by returning to the event routine 36 in the application coordinator 12 with a style=1 indication. The event routine 36 passes the style=1 indication to the event notify function 32 in the application program 20. The style=1 indication from the custom extension module 16 instructs the software application 20 that the custom pricing logic 40 is to execute prior to the default pricing logic 34.

An event notify function 33 responds to the returned style=1 indication by calling the event routine 36 and passing the event_name=PRICING parameter without a style request indication. The event routine 36 in turn calls the event routine 38 in the custom extension module 16 and passes the event_name=PRICING parameter. The event_name=PRICING parameter without a style request indication causes execution of the custom pricing logic 40.

Thereafter, the event routine 38 returns to the event routine 36, which returns to the event notify function 33. The event notify function 33 then proceeds on to the default pricing logic 34 in accordance with the style=1 indication returned from the custom extension module 16.

Figure 5:
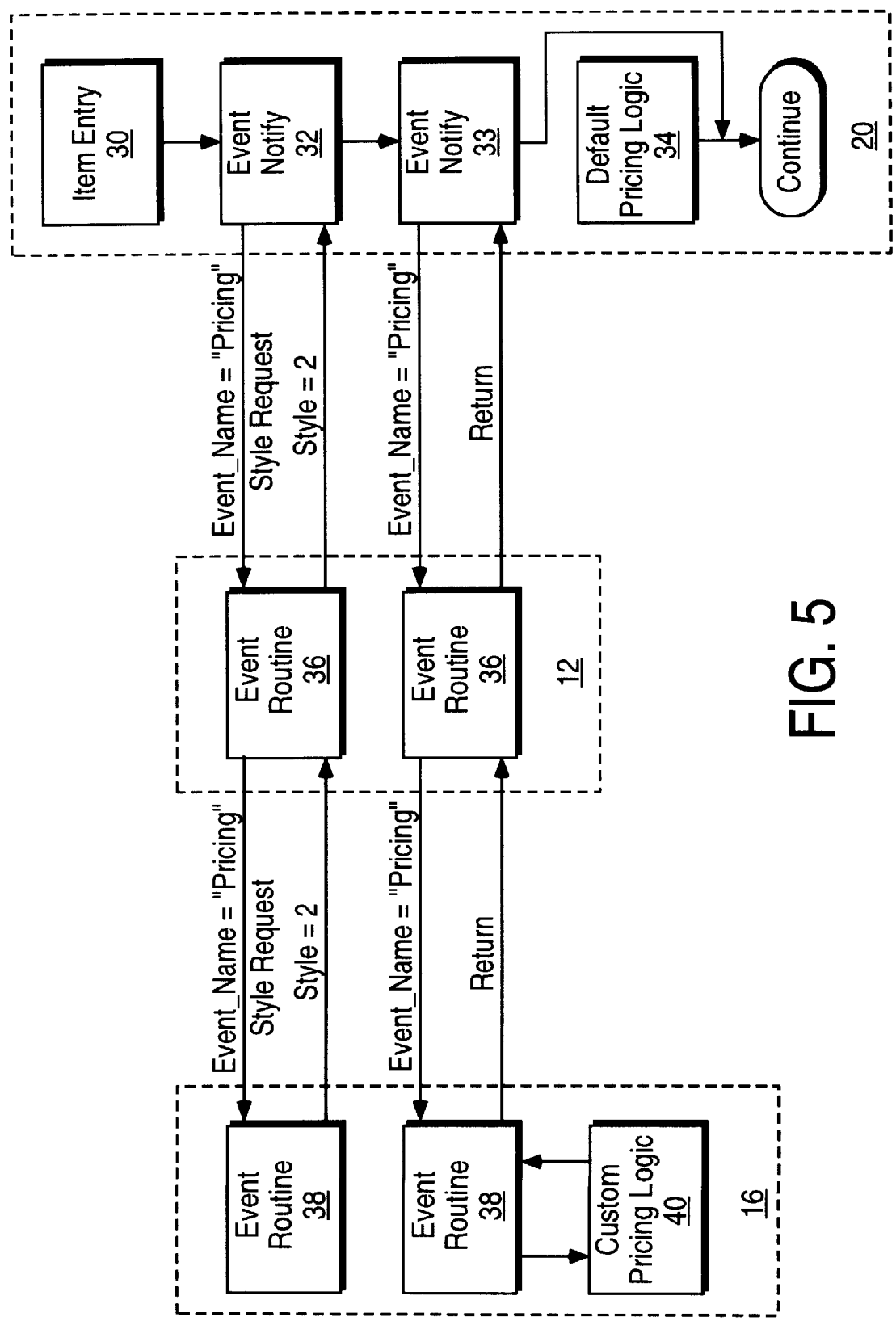
FIG. 5 illustrates a coordination style wherein the custom event handler in a custom extension module is executed in place of the corresponding default event handler in a software application.

FIG. 5 illustrates a coordination style wherein the custom event handler in the custom extension module 16 is executed in place of the corresponding default event handler in the software application 20. As before, the event notify function 32 calls the event routine 36 and passes the event_name=PRICING parameter along with a style request indication. The event routine 36 in turn calls the event routine 38 and passes the event_name=PRICING parameter and style request indication.

The event routine 38 responds to the event_name=PRICING parameter and style request indication by returning to the event routine 36 in the application coordinator 12 with a style=2 indication. The event routine 36 returns the style=2 indication to the event notify function 32. The returned style=2 indication informs the software application 20 that the custom pricing logic 40 is to execute in place of the default pricing logic 34.

The event notify function 33 responds to the returned style=2 indication by calling the event routine 36 and passing the event_name=PRICING parameter without a style request indication. The event routine 36 in turn calls the event routine 38 in the custom extension module 16 and passes the event_name=PRICING parameter. The event_name=PRICING parameter without a style request indication causes execution of the custom pricing logic 40.

Thereafter, the event routine 38 returns to the event routine 36, which returns to the event notify function 33. The event notify function 33 then bypasses the default pricing logic 34 in accordance with the style=2 indication returned from the custom extension module 16.

Figure 6:
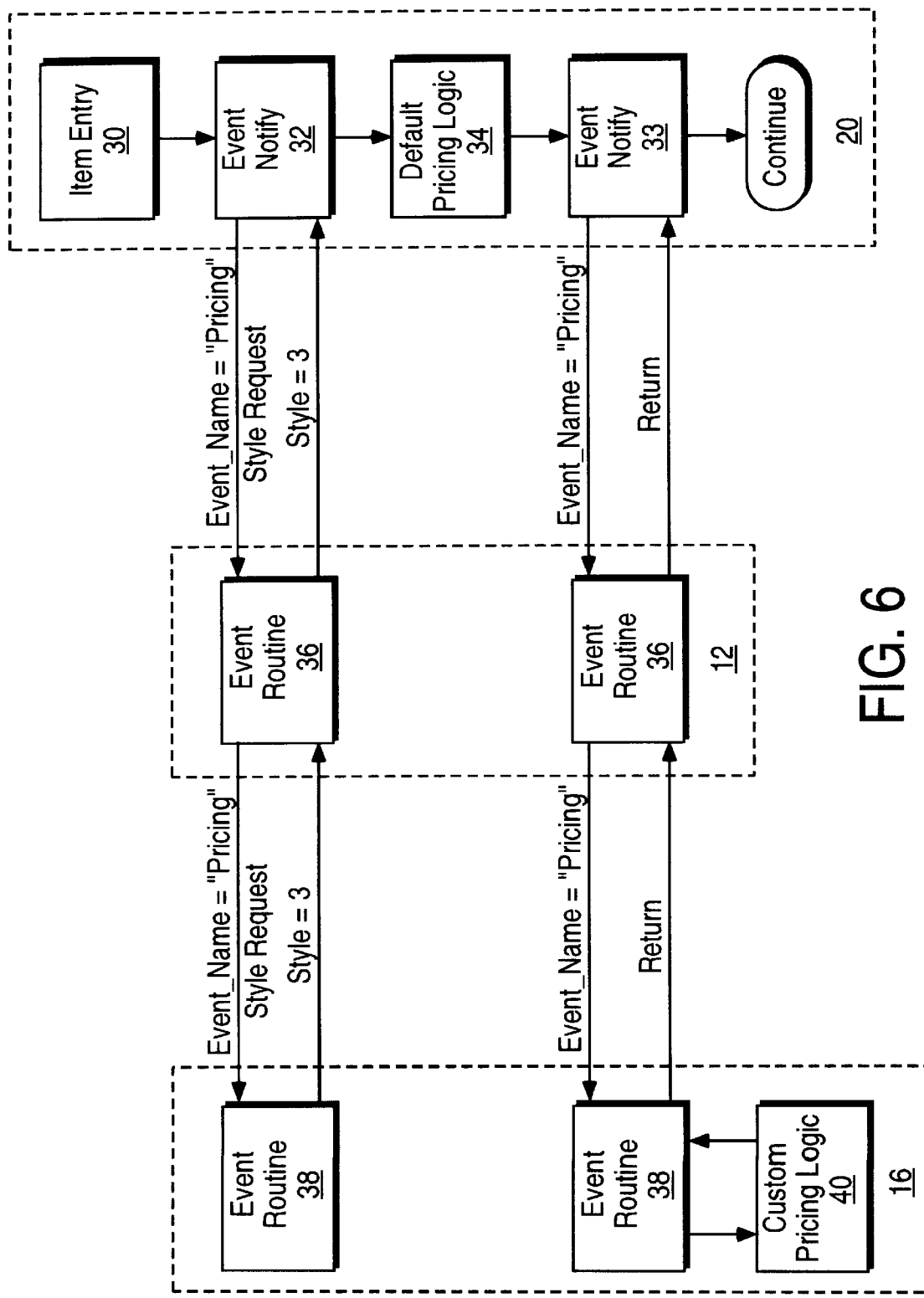
FIG. 6 illustrates a coordination style wherein the custom event handler in a custom extension module is executed after the corresponding default event handler in a software application.

FIG. 6 illustrates a coordination style wherein the custom event handler in the custom extension module 16 is executed after the corresponding default event handler in the software application 20. After the entry of an item identifier through the item entry function 30, the event notify function 32 calls the event routine 36 and passes the event_name=PRICING parameter with the style request indication. The event routine 36 then calls the event routine 38 and passes the event_name=PRICING parameter and style request indication.

The event routine 38 responds to the event_name=PRICING parameter and style request indication by returning to the event routine 36 with a style=3 parameter which is returned to the event notify function 32. The returned style=3 parameter instructs the software application 20 to proceed to the default pricing logic 34 and then to the event notify function 33.

After completion of the default pricing logic 34, the event notify function 33 calls the event routine 36 and passes the event_name=PRICING parameter without the style request indication. The event routine 36 then calls the event routine 38 in the custom extension module 16 and passes the event_name=PRICING parameter. The event_name= PRICING parameter without the style request indication causes the event routine 38 to execute the custom pricing logic 40 which performs a custom extension to the default pricing logic 34. Thereafter, the event routine 38 returns to the event routine 36 which in turn returns to the event notify function 33 in the application program 20.

Figure 7:
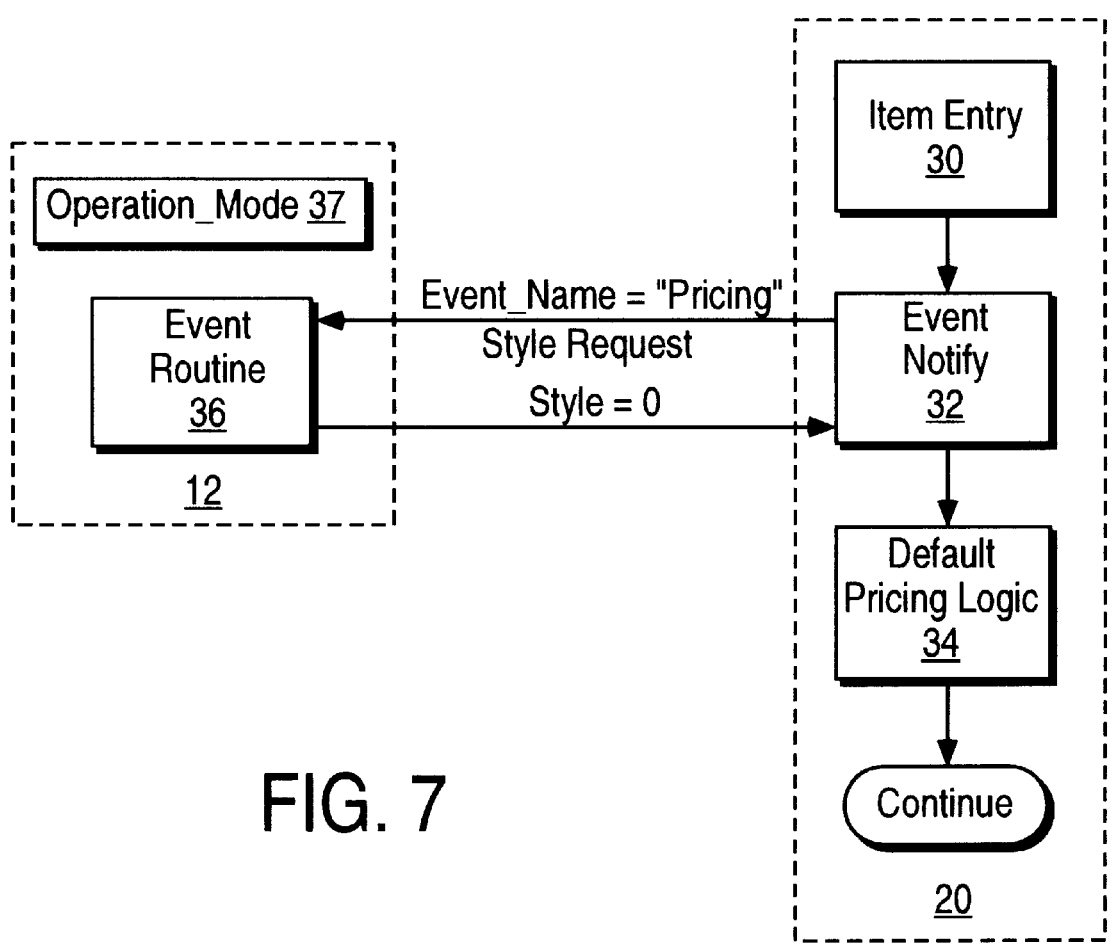
FIG. 7 illustrates a debug mode that severs the custom event handlers of the custom extension module from the software applications.

FIG. 7 illustrates communication in software system 10 in a first debug mode that severs the event handlers of the custom extension module 16 from the software applications 20–22. The application coordinator 12 accesses a set of global variables which may be resident in the main memory 504 including the operation_flag 37. The operation_flag 37 is set to a first predetermined state to disable event passing to the custom extension module 16. The operation_flag 37 in the first predetermined state causes the event routine 36 to return immediately to the event notify function 32 with a style=0 parameter in response to a call including style request from the event notify function 32. The returned style=0 parameter causes the event notify function 32 to proceed onto the application pricing logic 34 without any intervention by the custom extension module 16. A call to the event routine 36 without a style request returns immediately.

The user activates the first debug mode by setting the operation_flag 37 to the first predetermined state. This may be done by choosing a function on a pull-down menu on the output display 516, or by pressing a button on the input control device 512, or any other well-known graphical user interface (GUI) invocation method.

Figure 8:
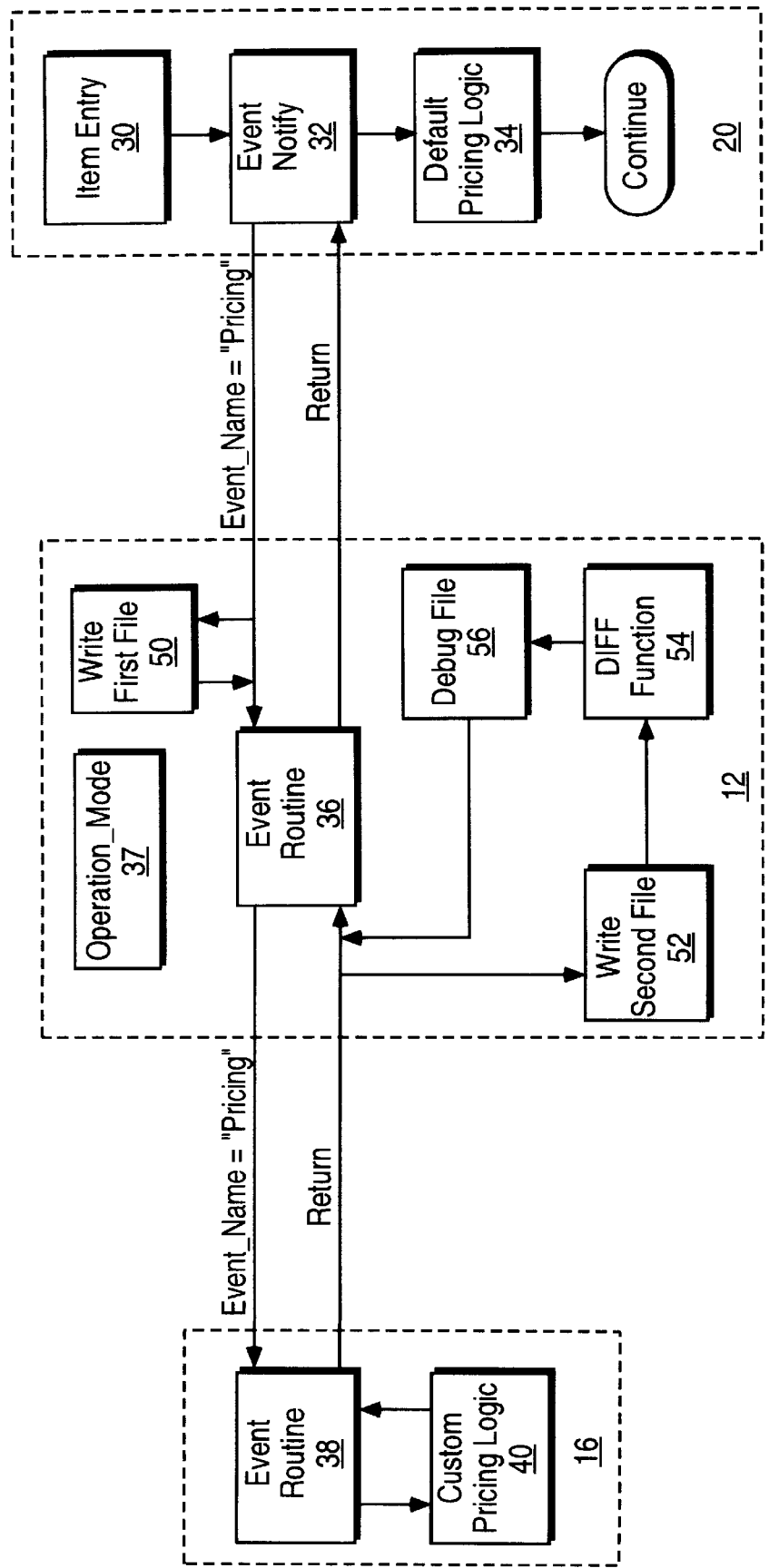
FIG. 8 illustrates a debug mode that records the state of the software application before and after calls to the custom extension module and that reports differences.

FIG. 8 illustrates a second debug mode that records the changes made by the custom pricing logic 40 to variables and parameters of the software application 20. The changes or differences may be recorded in a debug file 56 for later viewing or may be displayed in an on-screen window on the output display 516 or both.

In the second debug mode, the current values of all variables, parameters, etc. of the form handled by the software application 20 are written to a first file 50 before a call is made from the event routine 36 to the event routine 38. After control returns from event routine 38 to the event routine 36, the current values of all variables, parameters, etc. of the software application 20 are written to a second file 52. A difference (DIFF) function 54 is then executed that determines differences between the first and second files 50 and 52 including value changes along with variable and parameter names that correspond to the changes. Any differences detected are written to the debug file 56 or to the on-screen debug window including the event_name currently being processed, the name of the variable or parameter that has changed, and the values before and after the change. The first and second files 50 and 52 are preferably then removed and control returns to the event notify routine 32.

The user activates the second debug mode by setting the operation_flag 37 to a second predetermined state. The operation_flag may be set by choosing a function on a pull-down menu on the output display 516, or by pressing a button on the input control device 512, or any other well-known graphical user interface (GUI) invocation method. The second debug mode initially invokes a dialog that requests further information such as whether to view the changes on the output display 516 or in the debug file 56 or both, and the name of debug file 56.

The second debug mode enables debugging during execution of some or all of the custom code provided in the custom extension module 16. The execution of the custom code may be required to reproduce a specific problem, or may be required in order to prevent data corruption caused when data is introduced into the software system 10 which has not been processed fully. The reporting function allows a support person to identify illegal operations that code has performed without needing access to the actual source code that performs the custom logic.

Figure 9:
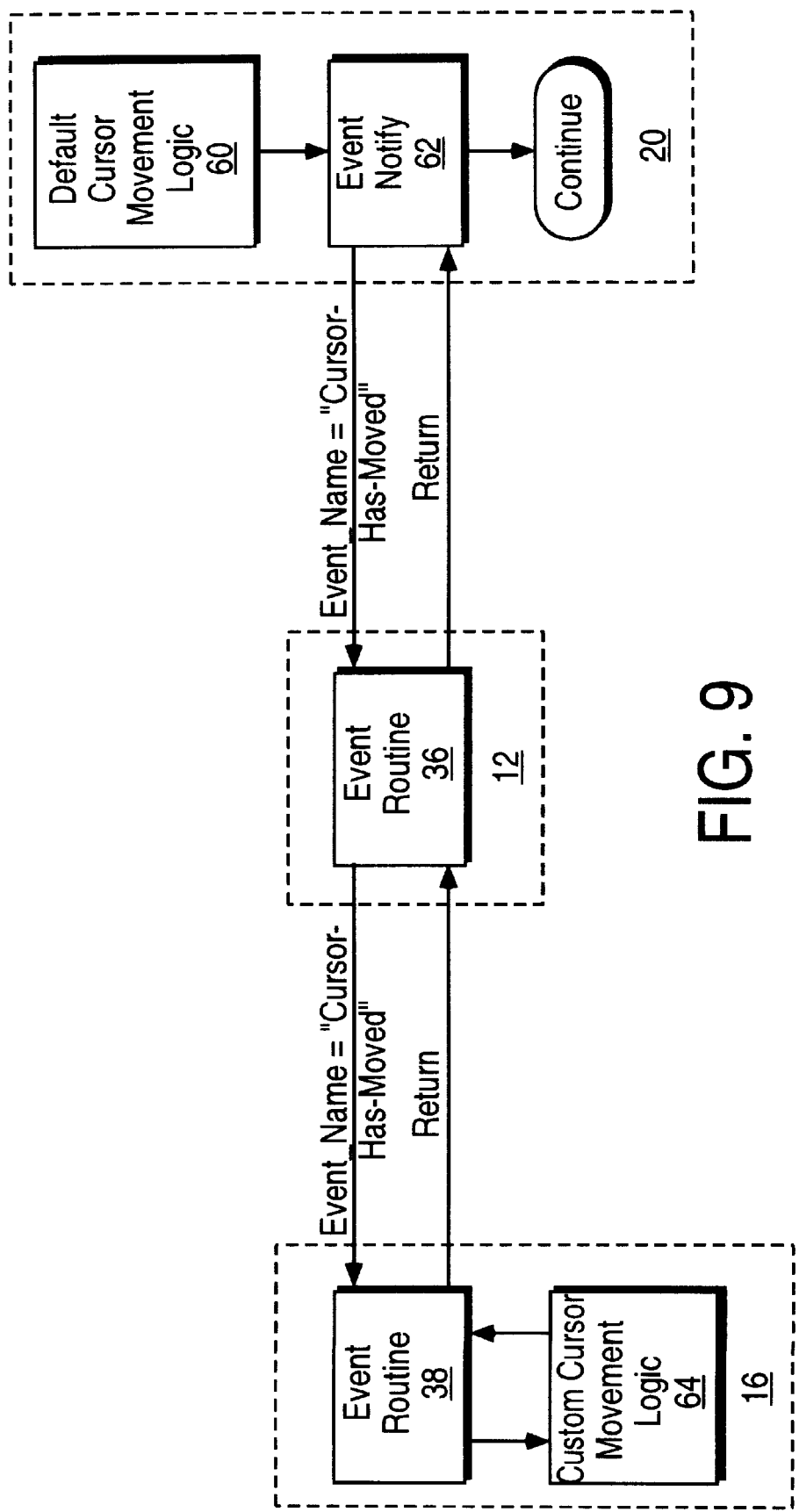
FIG. 9 illustrates communication between the default event handler and the custom event handler for events that do not require a coordination style.

FIG. 9 illustrates the handling by application coordinator 12 of certain events from the software application 20 that do not require a style coordination. For example, an event_ name=CURSOR-HAS-MOVED parameter is passed through the application coordinator 12 to the custom extension module 16 after the software application 20 has processed the movement of the cursor within the form 81 on the output display 516 using the default cursor movement logic 60. For such cursor movement events, the custom code in the custom extension module 16 cannot or need not perform any custom logic prior to or in place of the standard logic 60 for the cursor movement event contained in the software application 20.

Such events that do not require coordination are typically standard events of the software application 20. For example, the event_name=CURSOR-HAS-MOVED has associated logic in the software application 20 which must execute. Thereafter, the custom cursor movement logic 64 in the custom extension module 16 for the event_name= CURSOR-HAS-MOVED is run using the protocol discussed above but without the style request and style response messages.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for upgrading customized software, said method comprising the steps of:

receiving an updated version for a software application comprising a plurality of executable instructions, wherein said software application generates an event notification message for a predefined significant event in said software application and at least one default event handler for execution in response to said predefined significant event;

receiving at least one independent custom event handler comprising a plurality of computer readable instructions, for said software application, for execution in response to one of said predefined significant events, wherein said independent custom event handlers customize said software application;

receiving a coordination style to update said software application that determines whether an independent custom event handler for the significant event supplements or replaces a corresponding default event handler; and executing said updated version of said software application by receiving said event notification message and by selecting, based on said coordination style, an independent custom event handler or a default event handler for said corresponding predefined significant event so as to automatically integrate said updated version of said software application with computer readable instructions of said independent custom event handler, whereby said updated version of said software application includes said independent custom event handler without requiring reprogramming of computer readable instructions for said independent custom event handler.

2. The method of claim 1, wherein the step of executing said software application with a custom extension module comprises the steps of executing the default event handler and then executing the custom event handler if the coordination style indicates that the custom event handler is to execute after the default event handler.

3. The method of claim 1, wherein the step of executing said software application with a custom extension module comprises the steps of executing the custom event handler and then executing the default event handler if the coordination style indicates that the custom event handler is to execute before the default event handler.

4. The method of claim 1, wherein the step of executing said software application with a custom extension module comprises the steps of executing the custom event handler and then bypassing the default event handler if the coordination style indicates that the custom event handler is to execute in place of the default event handler.

5. The method of claim 1, further comprising the step of recording a state of variables and parameters for the software application before and after execution of the custom event handler.

6. The method of claim 5, further comprising the step of determining a difference between the state of variables and parameters for the software application before execution of the custom event handler and the state of the variables and parameters after execution of the custom event handler.

7. The method of claim 6, further comprising the step of recording the difference between the state of variables and parameters for the software application in a debug file.

8. The method of claim 6, further comprising the step of displaying the difference between the state of variables and parameters for the software application on a display screen.

9. A software system for upgrading customized software, said software system comprising:

an updated version for a software application comprising a plurality of executable instructions and at least one default event handler, wherein said software application generates an event notification message for a predefined significant event in said software application and said default event handler executes in response to said predefined significant event;

at least one independent custom event handler comprising a plurality of computer readable instructions, for said software application, for execution in response to one of said predefined significant events, wherein said independent custom event handlers customize said software application;

a coordination style to update said software application that determines whether an independent custom event handler for the significant event supplements or replaces a corresponding default event handler, wherein executing said updated version of said software application includes receiving said event notification message and selecting, based on said coordination style, an independent custom event handler or a default event handler for said corresponding predefined significant event so as to automatically integrate said updated version of said software application with computer readable instructions of said independent custom event handler, whereby said updated version of said software application includes said independent custom event handler without requiring re-programming of computer readable instructions for said independent custom event handler.

10. The software system of claim 9, wherein the coordination style causes the default event handler in the software application to execute before the custom event handler in the custom extension module.

11. The software system of claim 9, wherein the coordination style causes the default event handler in the software application to execute after the custom event handler in the custom extension module.

12. The software system of claim 9, wherein the coordination style causes the custom event handler in the custom extension module to execute in place of the default event handler in the software application.

13. The software system of claim 9, wherein the custom extension module is a default custom extension module that does not contain the custom event handler for the significant event.

14. The software system of claim 13, wherein the default custom extension module selects a coordination style that causes the software application to execute the default event handler.

15. The software system of claim 9, further comprising a debug mode that severs communication between the software application and the custom extension module.

16. The software system of claim 9, further comprising a debug mode that records a state of variables and parameters for the software application before and after execution of the custom event handler.

17. The software system of claim 16, wherein the debug mode determines a difference between the state of variables and parameters for the software application before execution of the custom event handler and the state of the variables and parameters after execution of the software application.

18. The software system of claim 17, wherein the debug mode records the difference between the state of variables and parameters for the software application in a debug file.

19. The software system of claim 17, wherein the debug mode displays the difference between the state of variables and parameters for the software application on a display screen.

20. A computer readable medium having a set of instructions stored therein, which when executed by a computer, causes the computer to upgrade customized software by performing the steps of:

receiving an updated version for a software application comprising a plurality of executable instructions, wherein said software application generates an event notification message for a predefined significant event in said software application and at least one default event handler for execution in response to said predefined significant event;

receiving at least one independent custom event handler comprising a plurality of computer readable instructions, for said software application, for execution in response to one of said predefined significant events, wherein said independent custom event handlers customize said software application;

receiving a coordination style to update said software application that determines whether an independent custom event handler for the significant event supplements or replaces a corresponding default event handler; and executing said updated version of said software application by receiving said event notification message and by selecting, based on said coordination style, an independent custom event handler or a default event handler for said corresponding predefined significant event so as to automatically integrate said updated version of said software application with computer readable instructions of said independent custom event handler, whereby said updated version of said software application includes said independent custom event handler without requiring reprogramming of computer readable instructions for said independent custom event handler.

21. The computer readable medium of claim 20, wherein the step of executing said software application with a custom extension module comprises the steps of executing the default event handler and then executing the custom event handler if the coordination style indicates that the custom event handler is to execute after the default event handler.

22. The computer readable medium of claim 20, wherein the step of executing said software application with a custom extension module comprises the steps of executing the custom event handler and then executing the default event handler if the coordination style indicates that the custom event handler is to execute before the default event handler.

23. The computer readable medium of claim 20, wherein the step of executing said software application with a custom extension module comprises the steps of executing the custom event handler and then bypassing the default event handler if the coordination style indicates that the custom event handler is to execute in place of the default event handler.

24. The computer readable medium of claim 20, further comprising the step of recording a state of variables and parameters for the software application before and after execution of the custom event handler.

25. The computer readable medium of claim 24, further comprising the step of determining a difference between the state of variables and parameters for the software application before execution of the custom event handler and the state of the variables and parameters after execution of the custom event handler.

26. The computer readable medium of claim 25, further comprising the step of recording the difference between the state of variables and parameters for the software application in a debug file.

27. The computer readable medium of claim 25, further comprising the step of displaying the difference between the state of variables and parameters for the software application on a display screen.

* * * * *